United States Patent
El-Wardany et al.

(10) Patent No.: US 7,805,824 B2
(45) Date of Patent: Oct. 5, 2010

(54) CONTROL OF WHITE-ETCHED LAYER DURING MACHINING

(75) Inventors: Tahany Ibrahim El-Wardany, Bloomfield, CT (US); Sergei F. Burlatsky, West Hartford, CT (US); Changsheng Guo, South Windsor, CT (US); Wayde R. Schmidt, Pomfret Center, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 12/779,191

(22) Filed: May 13, 2010

(65) Prior Publication Data

US 2010/0218657 A1 Sep. 2, 2010

Related U.S. Application Data

(62) Division of application No. 12/186,615, filed on Aug. 6, 2008, now Pat. No. 7,736,102.

(51) Int. Cl.
*B23P 23/00* (2006.01)
*B23D 43/02* (2006.01)

(52) U.S. Cl. .............. 29/566; 409/249; 407/13

(58) Field of Classification Search ........... 409/249, 409/258, 345, 135–136, 139–140; 82/900; 83/170; 219/121.65, 121.67, 121.68; 451/7; 29/566, 56.5, 50; 407/13, 15, 18, 12
See application file for complete search history.

(56) References Cited

U.S. PATENT DOCUMENTS

| 2,358,772 | A | 9/1944 | Brow et al. |
|---|---|---|---|
| RE23,092 | E | 3/1949 | Berliner |
| 2,477,411 | A | 7/1949 | King |
| 2,600,453 | A | 6/1952 | Weingart |
| 2,654,821 | A | 10/1953 | Gillett |
| 2,931,263 | A | 4/1960 | Johnson et al. |
| RE25,105 | E | 12/1961 | Cargill, Jr. |
| 3,951,019 | A | 4/1976 | Johnson et al. |

(Continued)

FOREIGN PATENT DOCUMENTS

CA 1 191 428 8/1985

(Continued)

OTHER PUBLICATIONS

European Search Report for EP Application No. 09250981.9, Dec. 9, 2009.

(Continued)

*Primary Examiner*—Erica E Cadugan
(74) *Attorney, Agent, or Firm*—Carlson, Gaskey & Olds, P.C.

(57) ABSTRACT

A machining system includes a support configured to retain an article, such as a rotor disk, having an area, such as a surface of a slot in the disk. A cutting tool, for example, a broach, is movable relative to the support to cut the area. A heating member, such as a laser, is configured to locally heat the area of the article. In one example, the cutting tool includes a body having a cutting edge. The heating member is supported by the body and is configured to provide heat adjacent to the cutting edge. The cutting edge cuts the locally heated area while the area is still heated.

5 Claims, 1 Drawing Sheet

U.S. PATENT DOCUMENTS

| | | | | |
|---|---|---|---|---|
| 4,008,631 | A | 2/1977 | Hahn et al. | |
| 4,098,153 | A | 7/1978 | Clark et al. | |
| 4,103,588 | A * | 8/1978 | Schmid | 409/136 |
| 4,163,402 | A | 8/1979 | Bykhovsky et al. | |
| 4,229,640 | A | 10/1980 | Castellani Longo | |
| 4,260,331 | A | 4/1981 | Goodwin | |
| 4,356,376 | A | 10/1982 | Komanduri et al. | |
| 4,733,049 | A | 3/1988 | Lemelson | |
| 4,824,328 | A | 4/1989 | Pisz et al. | |
| 5,430,936 | A | 7/1995 | Yazdzik, Jr. et al. | |
| 5,672,035 | A | 9/1997 | Pawlik | |
| 5,688,108 | A | 11/1997 | Dierksmeier et al. | |
| 5,741,119 | A | 4/1998 | Heppenstall | |
| 5,836,742 | A | 11/1998 | Dierksmeier et al. | |
| 5,859,405 | A | 1/1999 | Golz et al. | |
| 5,863,183 | A | 1/1999 | Dierksmeier et al. | |
| 5,906,459 | A | 5/1999 | Thomas et al. | |
| 6,013,140 | A | 1/2000 | Simoneaux | |
| 6,335,506 | B2 | 1/2002 | Christmas et al. | |
| 6,476,347 | B1 | 11/2002 | Whittenbury | |
| 6,666,630 | B2 | 12/2003 | Zimmermann et al. | |
| 6,744,010 | B1 | 6/2004 | Pepe et al. | |
| 6,883,234 | B2 | 4/2005 | Packman et al. | |
| 7,002,100 | B2 | 2/2006 | Wu et al. | |
| 7,257,879 | B1 * | 8/2007 | Jancso | 29/566 |
| 7,343,676 | B2 | 3/2008 | Ng | |
| 2005/0175462 | A1 | 8/2005 | Lagrange et al. | |

FOREIGN PATENT DOCUMENTS

| | | |
|---|---|---|
| DE | 2 207 260 | 10/1972 |
| GB | 579 076 | 7/1946 |
| JP | 61-152345 | 7/1986 |

OTHER PUBLICATIONS

Yilbas, B.S., et al., "Thermal and efficiency analysis of the CO2 laser cutting process," Optics and Lasers in Engineering, vol. 30, 1998, pp. 93-106.

* cited by examiner

CONTROL OF WHITE-ETCHED LAYER DURING MACHINING

This application is a divisional application of U.S. patent application Ser. No. 12/186,615, filed on Aug. 6, 2008 now U.S. Pat. No. 7,736,102.

BACKGROUND

This disclosure relates to a cutting tool and a method of machining.

A rotor of a typical gas turbine can have more than one hundred blades that are secured to rotating disks. The blade/disk attachment scheme includes providing a root on each blade that is secured to the disk. One type of root used to attach blades, commonly referred to as a "fir tree," includes a convoluted section that has a complementarily shaped slot in the disk periphery.

Broaching is one common method used to manufacture fir tree slots. Broaching nickel-based super-alloys may induce undesired surface characteristics such as excessive material strain hardening and surface microstructure alteration, which typically results in an uneven surface due to deflection during machining. A white-etched layer (WEL) on the surface is one indication of undesired surface characteristics. Aside from the high cost of the broach tools and limited tool life, part scrap rate will increase due to the defected surface integrity.

Several mechanical-based approaches are used to remove some of these undesired surface characteristics that remain after broaching. The efficiency of these approaches depends on the thickness of the WEL and depth of surface microstructure alteration. For example, the broached disk typically is moved to a second machining setup to perform post-processing operations to remove the undesired surface characteristics.

Some known post-processing operations include performing thermal treatment on the broached part by heating and rapid cooling, induction heating, and more recently, laser heat-treating. Such thermal treatment has typically been employed to increase surface hardness subsequent to broaching.

Although heating and rapid cooling increases surface hardness, this process also induces an internally stressed microstructure that makes the surface brittle. To relieve these internal stresses, a subsequent tempering process is required that typically entails heating the part to a temperature below the critical temperature for several hours. Although tempering facilitates avoidance of a microstructure phase change, the surface hardness is also undesirably reduced.

In induction heating, the part surface is placed within an induction coil. As electrical current in the induction coil is increased, the surface is heated above the critical temperature, thus also causing a microstructure phase change. When the surface is rapidly cooled, or quenched, a new microstructure phase is formed. Only a shallow depth beneath the surface is heated above the critical temperature and is rapidly quenched, while the remainder of the part remains unchanged. However, the rapid cooling also induces internal stresses that cause the surface to become brittle. Although a subsequent tempering process is required to relieve the internal stresses, tempering is time consuming. Additionally, the heat treated depth is controlled during induction hardening by producing a higher frequency current in the induction coil. However, common induction heating machines and surface area present limitations based on the highest frequency available.

Hardened steel surfaces have been produced by machining using laser processing. For example, a method of laser heat-treating a flat part, such as a knife or blade, has been employed by focusing a laser beam perpendicular to the major flat surface of the part using a cylindrical lens. The width of the beam is adjusted according to the desired width of the part to be heated. The part is then moved through the laser or the laser may be moved along the part to heat the surface. There is no subsequent machining of the surface of presence of a WEL.

It is desirable to provide a method of eliminating undesired surface characteristics during broaching without inducing further defects in the part.

SUMMARY

A machining system is disclosed that includes a support configured to retain an article, such as a rotor disk, having an area, such as a surface of a slot in the disk. A cutting tool, for example, a broach, is movable relative to the support to cut the area. A heating member, such as a laser, is configured to locally heat the area of the article. In one example, the cutting tool includes a body having a cutting edge. The heating member is supported by the body and is configured to provide heat adjacent to the cutting edge. The cutting edge cuts the locally heated area while the area is still heated.

These and other features of the disclosure can be best understood from the following specification and drawings, the following of which is a brief description.

BRIEF DESCRIPTION OF THE DRAWINGS

The disclosure can be further understood by reference to the following detailed description when considered in connection with the accompanying drawings wherein.

DETAILED DESCRIPTION

Figure 1:
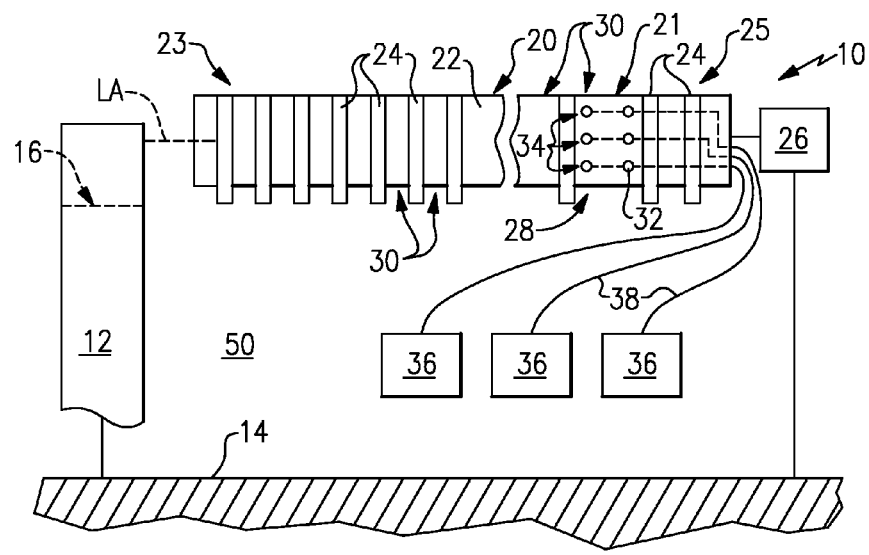
FIG. 1 is a highly schematic view of a machining system.

A machining system 10 is generally depicted in FIG. 1. The system 10 includes a support 14 that retains an article 12, such as a rotor disk. An example rotor disk is shown in more detail in FIG. 2. The rotor disk includes a slot 16 provided between lugs 18. The slot 16 is complementarily shaped to receive a fir-tree root of a rotor blade. Other slot shapes may be used to secure rotor blades to the rotor disk.

Figure 3:
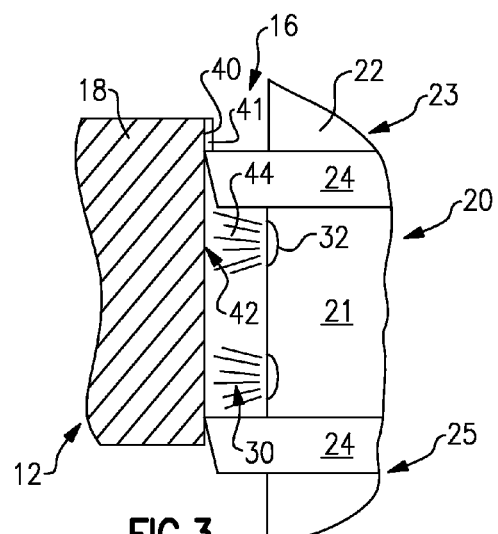
FIG. 3 is a partial cross-sectional view of the rotor disk shown in FIG. 2 with a tool cutting a locally heated area.

Returning to FIG. 1, a cutting tool 20 is movable relative to the article 12 to cut an area 42 of the article 12, best shown in FIG. 3. In one example, the cutting tool 20 is a broach tool. For example, a broach tool includes a body 22 supporting multiple teeth 24 that are spaced from one another from a forward end 23 to a rearward end 25 to provide gaps 30 between the teeth 24, as shown in FIGS. 1 and 3. The teeth 24 extend along a longitudinal axis LA of the body 22. The forward end 23 typically includes teeth that more aggressively cut the slot 16 than the teeth on the rearward end 25. Typically, the teeth on the forward and rearward ends 23, 25 are separated by a portion 21, which may include a generally flat surface. Slots 16 are typically broached using multiple broaching tools that include, for example, a rough broach, a semi-finish broach and a finish broach. In the example shown in FIG. 1, the cutting tool 20 is a finish broach tool.

Figure 2:
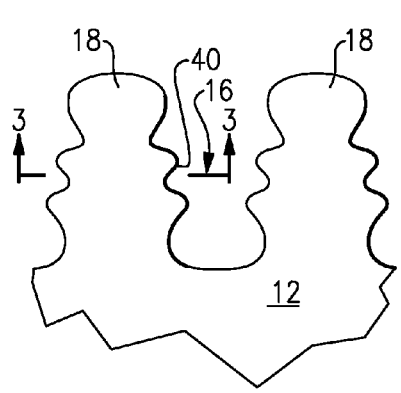
FIG. 2 is an end view of a rotor disk having a fir tree slot.

The cutting tool 20 is moved relative to the article 12 by an actuator 26. In the example of a broach tool, the teeth 24 progressively remove material from a surface 40 of the area 42 to form the slot 16, as shown in FIGS. 2 and 3. Immediately preceding predetermined teeth 24 cutting the surface 40, the system 10 heats the surface 40 of the area 42 using a heating member 28 (FIG. 1) so that an in-process heating of the surface 40 is provided during the broaching operation. In one example, the heating member 28 is arranged at the rearward end 25 adjacent to the cutting teeth 24 such that the surface 40 is heated prior to the last several teeth 24, thus facilitating providing a machined area substantially free from undesired surface characteristics. In one example, the surface 40 is machined in an environment 50 (FIG. 1) having a gas, such as helium or nitrogen, with a thermal conductivity greater than air. The environment 50 facilitates more controlled, precise heating of the surface 40.

The surface 40 is heated above the critical temperature, to facilitate enabling the surface 40 to be machined without introducing surface stresses or altering the microstructure undesirably. While the surface 40 is still heated, the teeth 24 in the rearward end 25 remove surface anomalies 41 as part of the final surface cuts.

In the example shown in FIG. 1, arrays 34 of lenses 32 are arranged in a gap 30 on the portion 21 between the teeth on the forward and rearward ends 23, 25. Lasers 36 are connected to the arrays 34 of lenses 32 by fibers 38. The finish broach tool is designed to accommodate the laser fiber optic beam delivery with the specified fiber core diameter. The body 22 of the broach tool is designed to allow for modular fiber replacement for easy maintenance. The desired number of fiber optic lenses depends upon, for example, the broaching insert pitch. In addition, the size, number and density of optic delivery fibers for the laser power is determined based upon the particular application. Possible alternates to fiber optics arrays include photonic crystals, Fresnel lenses, and diffraction gratings, for example. These lenses may utilize fewer individual laser feeds than fiber optics and may be able to do more thermal processing (for example, manifolding and banking). Various types of lasers are available for heat treating articles, including continuous wave $CO_2$ lasers, excimer lasers, diode-pumped solid state lasers, femtosecond lasers, and continuous wave Nd:YAG.

The laser 36 produces a beam 44 that is focused, via the lens 32 or the like, which generates an intense energy flux that rapidly heats the surface 40. Laser heat treatment allows the laser beam to be controlled to heat the surface of the metal article above the critical temperature to a depth of only a few microns. The surface 40 is heated to a depth of less than 20 microns (0.00079 inch), for example, 1-2 microns (0.00004-0.00008 inch). Controlling the depth of the heating to this shallow level allows for self-quenching. That is, no liquid or air quenching is required. Self-quenching is accomplished by conduction due to the mass and temperature disparity between the portion of the article not heated by the beam and the small depth of the surface that is heated above the critical temperature by the beam. The heat on the surface is quickly transferred to the unheated portion thereby quenching the heated surface. The laser power is adjusted to achieve the required temperature for heating the surface.

Calculation of laser heating parameters (heated-layer thickness and laser power requirements) and the flow field developed at the gas-liquid boundary is accounted for based upon known flow equations. A laminar model for the flow conditions is taken into account. At any time the interface between the liquid layer and solid material is a straight line and is the melting isotherm. The heat transfer rate at the interface is determined to calculate the temperature rise across the liquid layer. The heat transfer to the solid material is also calculated, which will be less than the heat transferred from the hot gas boundary layer to the liquid metal by an amount equal to that absorbed by the first layer.

Although example embodiments have been disclosed, a worker of ordinary skill in this art would recognize that certain modifications would come within the scope of the claims. For that reason, the following claims should be studied to determine their true scope and content.

What is claimed is:

1. A cutting tool comprising:
   a body that extends longitudinally, with multiple longitudinally spaced teeth supported on the body, each of the teeth including a cutting edge; and
   a heating member including a lens supported by the body and provided in a gap between at least two adjacent ones of the teeth and that is configured to provide heat adjacent to one of the cutting edges.

2. The cutting tool according to claim 1, wherein an array of the lenses is provided in the gap.

3. The cutting tool according to claim 1, wherein the cutting tool is a broaching tool.

4. The cutting tool according to claim 1, wherein the heating member is provided at a rearward end of the body distal with respect to an article to be machined by the cutting tool.

5. The cutting tool according to claim 1, wherein a fiber is connected to the lens, the fiber configured to provide laser light to the lens.

* * * * *